(12) United States Patent
Copeland (10) Patent No.: US 7,104,573 B2
(45) Date of Patent: Sep. 12, 2006

(54) ENERGIZED RESTRAINING GASKET FOR MECHANICAL JOINTS OF PIPES

(75) Inventor: Daniel A. Copeland, Bessemer, AL (US)

(73) Assignee: United States Pipe and Foundy Company, LLC, Birmingham, AL (US)

(*) Notice: Subject to any disclaimer, the term of this patent is extended or adjusted under 35 U.S.C. 154(b) by 0 days.

(21) Appl. No.: 10/685,914

(22) Filed: Oct. 15, 2003

(65) Prior Publication Data

US 2004/0075217 A1   Apr. 22, 2004

Related U.S. Application Data

(63) Continuation-in-part of application No. 09/590,586, filed on Jun. 8, 2000.

(51) Int. Cl.
*F16L 19/00* (2006.01)

(52) U.S. Cl. .............. 285/337; 285/343; 285/342; 285/421; 29/890.14

(58) Field of Classification Search .......... 285/421, 285/339, 340, 342, 337, 105; 29/890.14
See application file for complete search history.

(56) References Cited

U.S. PATENT DOCUMENTS

| | | | |
|---|---|---|---|
| 784,400 A | 3/1905 | Howe | |
| 1,818,493 A | 8/1931 | McWane | |
| 1,930,194 A | 10/1933 | Dillon | |
| 2,201,372 A | 5/1940 | Miller | |
| 2,473,046 A | 6/1949 | Adams, Jr. | |
| 2,491,004 A | 12/1949 | Graham | |
| 2,508,914 A | 5/1950 | Graham | |
| 2,953,398 A | 9/1960 | Haugen | |
| 3,400,950 A | 9/1968 | Quebe et al. | |
| 3,445,120 A | 5/1969 | Barr | |
| 3,582,112 A | 6/1971 | Pico | |
| 3,606,402 A | 9/1971 | Medney | |
| 3,724,880 A | 4/1973 | Seiler | |
| 3,726,549 A | 4/1973 | Bradley | |
| 3,731,955 A | 5/1973 | Borsum et al. | |

(Continued)

FOREIGN PATENT DOCUMENTS

JP   S52-29625 A   3/1977

(Continued)

OTHER PUBLICATIONS

U.S. Appl. No. 09/590,586, filed Jun. 8, 2000, Holmes.

(Continued)

*Primary Examiner*—David Bochna
(74) *Attorney, Agent, or Firm*—Bradley Arant Rose & White LLP (57) ABSTRACT

A gasket for converting a standard mechanical joint into a restrained mechanical joint without the need for altered configuration of the bell, spigot, or gland of the joint, and without the need for additional fittings or devices. In the practice of the present invention, a standard mechanical joint's bell and gland configuration can be employed to connect a spigot end of one pipe length to the bell end of another pipe length in a restrained relationship, with the restraint based on forces superior to rubber-to-pipe friction. In more particular discussion of the embodiments taught, the invention includes forming the gasket to fit within the bell in such a manner that a void, or gutter, exists during rest, into which void the gasket compresses, which in turn influences the rotational motion of the segment. In this manner, the configuration of the gasket influences the timing and extent of rotation throughout the process of securing the gland to the bell.

6 Claims, 8 Drawing Sheets

INITIAL PHASE GASKET NOT COMPRESSED

U.S. PATENT DOCUMENTS

| | | | |
|---|---|---|---|
| 3,733,093 A | 5/1973 | Seiler | |
| 3,877,733 A | 4/1975 | Straub | |
| 3,963,298 A | 6/1976 | Seiler | |
| 4,119,333 A | 10/1978 | Straub | |
| 4,119,335 A | 10/1978 | Rieffle | |
| 4,229,026 A | 10/1980 | Seiler | |
| 4,396,210 A | 8/1983 | Spencer | |
| 4,428,604 A | 1/1984 | Conner | |
| 4,524,505 A | 6/1985 | Conner | |
| 4,540,204 A | 9/1985 | Battle | |
| 4,602,792 A | 7/1986 | Andrick | |
| 4,606,559 A | 8/1986 | Rammelsberg | |
| 4,643,466 A | 2/1987 | Conner et al. | |
| 4,647,083 A | 3/1987 | Hashimoto | |
| 4,660,866 A | 4/1987 | Jones | |
| 4,662,656 A | 5/1987 | Douglas et al. | |
| 4,664,426 A | 5/1987 | Ueki | |
| 4,685,708 A | 8/1987 | Conner et al. | |
| 4,789,167 A | 12/1988 | Housas | |
| 4,805,932 A | 2/1989 | Imhof et al. | |
| 4,848,805 A | 7/1989 | Bucher et al. | |
| 4,867,488 A | 9/1989 | Jones | |
| 4,878,698 A | 11/1989 | Gilchrist | |
| 5,024,454 A | 6/1991 | McGlip | |
| 5,037,144 A | 8/1991 | Peting | |
| 5,058,907 A | 10/1991 | Percebois | |
| 5,067,751 A * | 11/1991 | Walworth et al. | 285/105 |
| 5,094,467 A | 3/1992 | Lagabe | |
| 5,150,929 A | 9/1992 | Greatorex | |
| 5,176,413 A | 1/1993 | Westman | |
| 5,197,768 A | 3/1993 | Conner | |
| 5,219,189 A | 6/1993 | Demoisson | |
| 5,269,569 A | 12/1993 | Weber et al. | |
| 5,295,697 A * | 3/1994 | Weber et al. | 285/105 |
| 5,297,826 A | 3/1994 | Percebois | |
| 5,328,215 A | 7/1994 | Grenier | |
| 5,332,043 A | 7/1994 | Ferguson | |
| 5,335,946 A | 8/1994 | Dent | |
| 5,340,169 A | 8/1994 | Hoffmann | |
| 5,360,218 A * | 11/1994 | Percebois et al. | 285/105 |
| 5,398,980 A | 3/1995 | Hunter et al. | |
| 5,431,453 A | 7/1995 | Yamashita | |
| 5,464,228 A | 11/1995 | Weber | |
| 5,476,290 A | 12/1995 | Bergmann et al. | |
| 5,476,292 A | 12/1995 | Harper | |
| 5,496,073 A | 3/1996 | Grenier | |
| 5,603,530 A | 2/1997 | Guest | |
| 5,609,368 A | 3/1997 | Maki et al. | |
| 5,645,285 A | 7/1997 | Percebois | |
| D398,504 S | 9/1998 | Yamashita | |
| 5,803,513 A | 9/1998 | Richardson | |
| 5,897,146 A | 4/1999 | Saito et al. | |
| 5,918,914 A | 7/1999 | Morris | |
| 5,992,905 A | 11/1999 | Kennedy, Jr. | |
| 6,019,396 A | 2/2000 | Saito et al. | |
| 6,062,611 A | 5/2000 | Percebois | |
| 6,168,210 B1 | 1/2001 | Bird | |
| 6,173,993 B1 | 1/2001 | Shumard et al. | |
| 6,220,635 B1 | 4/2001 | Vitel et al. | |
| 6,299,217 B1 | 10/2001 | Saito et al. | |
| 6,502,865 B1 | 1/2003 | Steele | |
| 6,502,867 B1 * | 1/2003 | Holmes et al. | 285/337 |
| 6,568,658 B1 | 5/2003 | Strome | |
| 6,688,652 B1 * | 2/2004 | Holmes et al. | 285/105 |
| 6,921,114 B1 | 7/2005 | Washburn et al. | |
| 2002/0158466 A1 | 10/2002 | Jones | |
| 2004/0155458 A1 | 8/2004 | Holmes et al. | |
| 2005/0006855 A1 | 1/2005 | Holmes et al. | |
| 2005/0067836 A1 | 3/2005 | Copeland | |

FOREIGN PATENT DOCUMENTS

| | | |
|---|---|---|
| WO | WO 01/13023 | 2/2001 |
| WO | WO 03/050421 A2 | 6/2003 |
| WO | WO 2005/031174 A2 | 4/2005 |
| WO | WO 2005/047745 A2 | 5/2005 |

OTHER PUBLICATIONS

U.S. Appl. No. 10/774,544, filed Feb. 9, 2004, Holmes.
U.S. Appl. No. 10/841,197, filed May 7, 2004, Holmes.
U.S. Appl. No. 10/950,263, filed Sep. 24, 2004, Copeland.

* cited by examiner

FIGURE 1: TYPICAL MECHANICAL JOINT NOMENCLATURE

FIGURE 2: INITIAL PHASE GASKET NOT COMPRESSED

FIGURE 4: TRANSITION PHASE GASKET PARTIALLY COMPRESSED

FIGURE 5: SEGMENT PREFERRED

FIGURE 6: FINAL PHASE GASKET FULLY COMPRESSED

FIGURE 7: SEGMENT-ALTERNATE

FIGURE 8: CROSS-SECTIONAL VIEW OF GASKET AT SEGMENT

ENERGIZED RESTRAINING GASKET FOR MECHANICAL JOINTS OF PIPES

This is a continuation in part of currently co-pending application Ser. No. 09/590,586 filed on Jun. 8, 2000, to which this application claims priority and benefit, and which hereby is incorporated by reference.

BACKGROUND OF THE INVENTION

1. Field of the Invention

This invention relates generally to connections between lengths of pipe, or between pipes and fittings. More particularly, the invention is directed toward a device and method of connecting two lengths of pipe that maximizes the advantages of both restrained push-on joints as well as mechanical joints, as are known commonly in the art. The invention has application to long-run pipe lengths as well as fittings, appurtenances, and connections.

2. Description of Related Art

Due to thrust forces, earth movement, and external mechanical forces exerted on pipes, the industry has focused substantial attention on the problem of maintaining connections between adjacent lengths of pipe after installation. The result of this attention is a library of differing solutions and approaches known in the art. The majority of these solutions can be categorized as either "push-on" joints or "mechanical joints." References to "pipe" made by the inventor with respect to application or use of the present invention shall be understood to include fittings, connections, and any other appurtenances to pipes.

The most common connection device used in the art for connection of straight-run lengths of pipe is a "push-on" pipe/bell configuration. These push-on solutions are exemplified by U.S. Pat. No. 2,953,398, and account for the majority of straight-run pipe connections. In a typical configuration, a spigot end of a pipe slides into a bell end of another pipe past a tightly fitted gasket. No follower ring, stuffing box, or other external compression means typically is present in a push-on joint. Additionally, the typical push-on joint does not include a restraining means, though such means as tie bars, concrete thrust blocks, screws, and additional ring attachments have been employed in some cases to effect restraining to the joints. Advancements in the art have led to innovations and modifications of push-on joints to include restraining means. Examples of such restrained push-on joints include U.S. Pat. Nos. 5,295,697; 5,464,228; and 5,067,751. The securement of the connection in such advancements may be effected by locking segments or wedges within the gasket that engage the spigot. The locking segments are oriented in such a manner as to allow entry of the spigot into the bell, but upon counterforces tending to effect removal of the spigot, the segments pivot toward a biting engagement with the spigot, stopping further removal. The effect is much like a child's "finger lock" toy, the stronger the attempt to remove the pipe, the greater the locking effect exerted by the inserts. These push-on type joints enjoy superior flexibility and resistance to both axial and para-axial separative forces. Meaningful difficulty has been experienced in the industry, however, in applying these connections to fittings, where it may be impracticable to secure the fitting sufficiently to exert the high installation pressures necessary initially to push the spigot into the bell in such configurations.

A "mechanical joint" is a well-known standardized connection device widely employed in the pipe industry. Such a joint fluid-seals two lengths of pipe together by compressing a gasket around a spigot and within a bell at the intersection. Mechanical joints are characterized by an outwardly flanged bell of a receiving pipe, into which a spigot of a second pipe is inserted. The bell is adapted to seat a gasket that fits snugly about the circumference of the spigot of the second pipe, and further to receive a supporting compression ring or gland. In assembly, the spigot is fully advanced into the bell and the gasket is firmly seated within the bell and around the spigot. The gland is then forced against the gasket by fastening it securely to the bell flange through such means as fastening bolts tightened under relatively high torque. This configuration typically includes a lip about the inner diameter of the gland that upon securement extends axially within the bell. The configuration of the gland is such that as the lip is forced against the gasket, the gasket becomes compressed under pressures sufficient to deform the gasket. As the gasket is compressed between the bell and the gland, the gasket therefore is squeezed inwards toward and into sealing contact with both the exterior of the inserted pipe section and the interior of the bell. This deformation enhances the sealing effectiveness of the gasket beyond that which can be readily obtained in the absence of compression or high insertion forces The mechanical joint enjoys wide acceptance in the industry, and is the subject of national and international standards such as ANSI/AWWA C111/A21.11-95. Given the industry affinity for such joints and the embedded nature of these standards into specifications, any mechanical joint should conform to these specifications to gain optimal acceptance. Numerous attempts have been made to improve upon the standardized mechanical joint. These attempts are almost uniformly characterized by the inclusion of an additional mechanism or attachment, creating a mechanical connection resistive to separation of the pipes. Such attempts that require modification of the bell or gland (or both) are exemplified by U.S. Pat. No. 784,400 to Howe, which employs locking inserts recessed within the gland; U.S. Pat. No. 1,818,493, to McWane, which discloses a modified gland that relies upon specially modified bolts having toothed cams that both pivot on and bite into the spigot as the bolts are hooked under a modified lip of the bell and forced into grooves in the gland.

Further solutions employ additional restraining devices or teeth interposed between the gasket and the gland, which are driven into the spigot as the gland is tightened. Included among these devices are U.S. Pat. No. 4,664,426, to Ueki; and U.S. Pat. No. 5,297,826, to Percebois, which each require the use of multiple additional locking devices in addition to the standard mechanical joint's simple bell-gasket-gland configuration. U.S. Pat. No. 4,878,698, to Gilchrist, U.S. Pat. No. 5,335,946, to Dent, et al, and U.S. Pat. No. 5,398,946, to Hunter, et al., appear susceptible to, possible early engagement of the biting teeth prior to full seating of the gland. U.S. Pat. No. 5,803,513, to Richardson and others attempt to solve this potential problem by use of sacrificial skid pads to prevent early engagement of the teeth.

Additional solutions employ a bolting assembly attached to (or incorporated into) the bell, which assembly is oriented such that upon tightening of certain specially configured bolts, the bolts or a device actuated thereby are driven into the outer surface of the spigot. These bolting schemes are exemplified by devices sold by EBAA Iron, commonly known in the art under the trademark MEGALUG (Registration No. 1383971) Further examples of this type of solution include U.S. Pat. No. 4,647,083, to Hashimoto, which modifies the standard gland to include bolts that act upon locking wedges when tightened. When a pipe is installed in a ground-bedded environment, it is typically inconvenient to have multiple additional bolting requirements on the underside of the pipe as laid. Such underside boltings increase the cost and time of installation. If, however, the bolt-in locking scheme employs only a few bolt locations, the inward pressure of the bolts may in some conditions tend to deform the cross-sectional profile of the spigot. For example, employment of only three bolt locations in some circumstances may exhibit an undesirable possibility of deforming the spigot into a slightly triangular shape.

It will be noted by those reasonably skilled in the art that each of these configurations also suffers from practical issues, such as the expense of manufacture of additional components and the fact that additional components increase the potential for unacceptable failure.

Furthermore, each of these solutions may be considered a "static" connection. Although pipelines are traditionally considered to be rigid and immobile structures, a durable connection must allow for a certain amount of flexibility and "play" at joints. Such accommodation to movement is necessary because the environments in which pipelines lay are not truly static. Thrust forces may create non-longitudinal, or para-axial, loads that tend to drive a pipe length toward an angle from the longitudinal axis of the lengths to either side of such axis. As the pressures of the material being transported within the pipe vary, the forces will similarly vary. Additionally, locations in which pipes are run rarely are as stable as commonly believed. In fact, pipes may be run above ground, in which cases such pipes do not enjoy the benefit of any stability enhancing factors of bedding or trenched installation. Finally, even typical earth-bedded pipes must endure shifting due to sedimentation, erosion, compaction, mechanical forces (such as nearby construction), and earth movement (such as earthquakes).

A variation of the push-on joint is evidenced by U.S. Pat. No. 2,201,372, to Miller, which employs a compression snap-ring fitted within a special lip of the bell, in order to exert pressure onto the locking segments and thus drive them into the spigot. Alternatives in Miller similarly drive locking segments into the spigot upon installation. U.S. Pat. No. 3,445,120, to Barr, likewise employs a gasket with stiffening segments completely encased therein that are generally disposed in a frustroconical arrangement. Such segments are stated to give the gasket a resistance to compression along the plane that includes both ends of the segment. When a spigot is subjected to withdrawing forces, the gasket rolls with the movement of the pipe. As the gasket rolls, it is intended to eventually encounter a position in which the stiffened plane needs to compress for further rolling. In optimal conditions, due to the stiffening, the gasket cannot compress and therefore cannot roll further. As the rolling stops, the gasket becomes a static friction-based lock between the spigot and the bell. Notably, among other distinctions, the arrangement taught by Barr remains a rubber-to-pipe frictional connection.

OBJECTS OF THE INVENTION

The following stated objects of the invention are alternative and exemplary objects only, and no one or any should be read as required for the practice of the invention, or as an exhaustive listing of objects accomplished.

As suggested by the foregoing discussion, an an exemplary and non-exclusive alternative object of this invention is to provide a gasket interchangeable with gaskets of standard mechanical joints which allows for the transformation of the joint into a restrained joint without the need for any reconfiguration or adaptation of the bell, spigot, or gland of the mechanical joint involved.

A further exemplary and non-exclusive alternative object is to provide a dynamic connection for pipes that does not require high insertion pressures.

A further exemplary and non-exclusive alternative object of the invention is to provide for a cost effective manner and device of restraining a typically configured pipe joint.

The above objects and advantages are neither exhaustive nor each individually critical to the spirit and practice of the invention, except as stated in the claims as issued. Other objects and advantages of the present invention will become apparent to those skilled in the art from the following description of the invention.

BRIEF SUMMARY OF THE INVENTION

The present invention may be described basically as a gasket for converting a standard mechanical joint into a restrained mechanical joint without the need for altered configuration of the bell, spigot, or gland of the joint, and without the need for additional fittings or devices. In the practice of the present invention, a standard mechanical joint's bell and gland configuration can be employed to connect a spigot end of one pipe length to the bell end of another pipe length in a restrained relationship (restraint being defined as resistance to axial separation of a mated bell and spigot), with the restraint based on forces superior to rubber-to-pipe friction. In more particular discussion of some of the embodiments taught, the invention includes forming the gasket to fit within the bell in such a manner that a void exists during rest, into which void the gasket deforms, which in turn influences the rotational motion of the segment. In this manner, the configuration of the gasket influences the timing and extent of rotation during the process of securing the gland to the bell. Overpenetration may be avoided, while at the same time ensuring sufficient penetration at the proper moment in time. Controlling the timing and extent of locking segment rotation influences gasket performance and is addressed by the described embodiments of this invention. The extent of segment rotation affects the application of restraint. Once restraint occurs, which typically is when the segment has rotated into an interference position between bell and spigot, further meaningfully helpful gasket compression typically no longer occurs. Rotating the segment too early yields insufficient gasket compression for adequate sealing. Rotating the segment too late may not sufficiently restrain the joint.

DETAILED DESCRIPTION OF THE INVENTION

The following is a detailed description of the invention. Those skilled in the art will understand that the specificity provided herein is intended for illustrative purposes with respect to the inventor's most preferred embodiment, and is not to be interpreted as limiting the scope of the invention. References to "pipe" herein shall be understood equally to refer to any pipe length, appurtenance, fitting, or any other connected device or element regardless of the method or material of manufacture.

Figure 1:
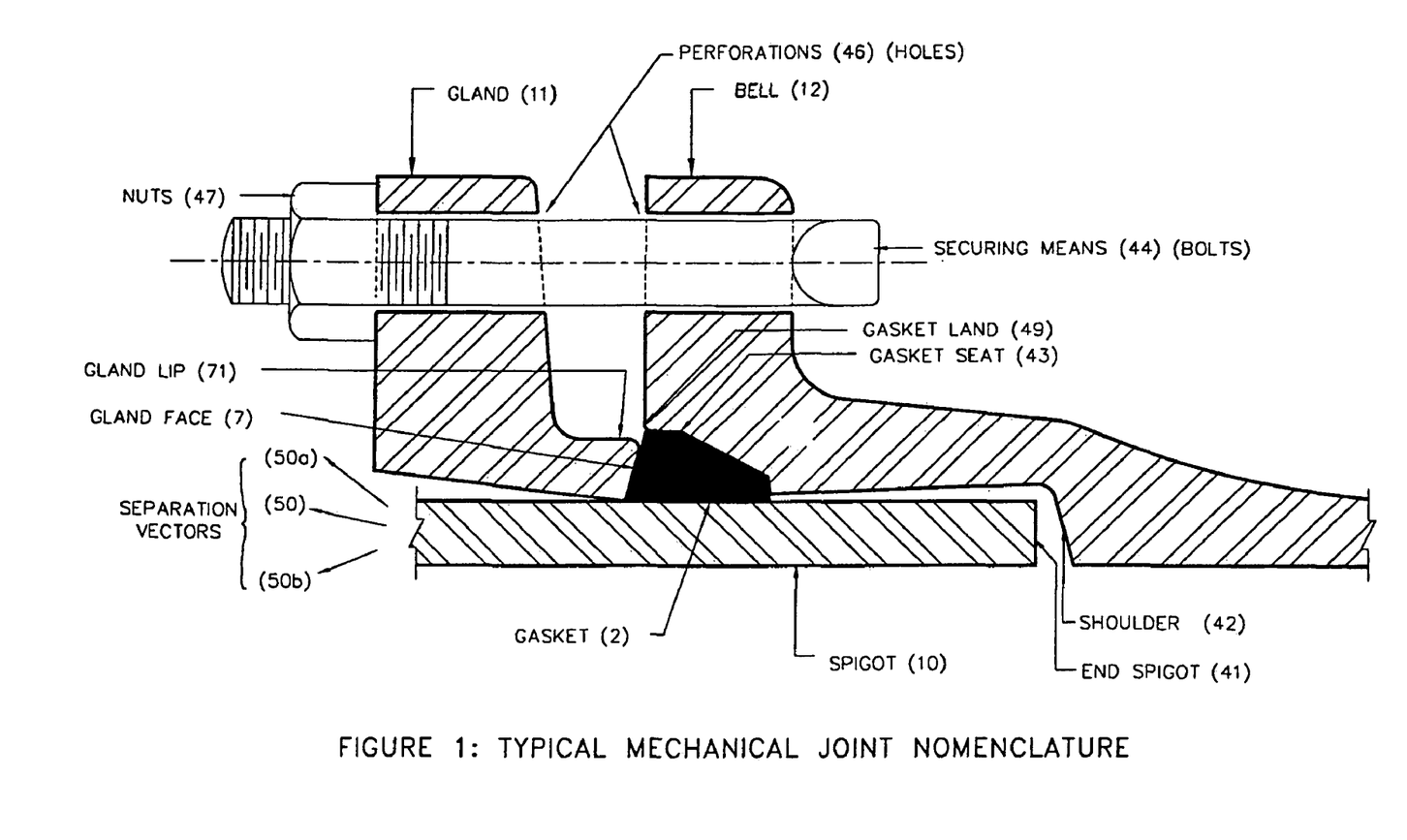
FIG. 1 shows an diagram of the typical mechanical joint, having a gasket in place.

Turning now to the drawings, FIG. 1 presents a diagram of a typical mechanical joint. Assembly of the joint according to the current invention is practiced as known in the art. Particularly, but without limitation of the known variants which shall be as equally applicable to the present invention as they are to the known art, the joint contains the following elements in the following relationship. Compression ring or gland 11 is placed on spigot 10, following which gasket 2 is placed around the exterior of spigot 10. Spigot 10 is then advanced within bell 12 until the end 41 of spigot 10 is stopped by an annular shoulder 42 within bell 12. Gasket 2 is advanced into bell 12 until it seats in the annular recess seat 43, as shown. Gland 11 is then abutted against gasket 2 and is secured to bell 12 by securing devices 44, which are presented for illustration here as bolts 45 passing through perforations 46 and engaged by nuts 47. As is evident, upon drawing up or tightening of nuts 47, gland 11 is compressed against gasket 2, causing it to compress. Alternative securing means will be apparent to those in the industry, such as overcenter clamps, cam locks, ramped wedges, ramped annular rings, and rivets, and could include any mechanism that may be used to decrease the axial spacing between the gland 11 and the bell 12. Due to the constraining presence of recess seat 43 and gland 11, deforming of gasket 2 may be directed primarily radially inward toward and into sealing engagement with spigot 10. The invention of the present disclosure builds upon this interrelationship and requires no changes to the spigot, bell, or gland, though such changes may be accommodated within the spirit of the invention if such modifications are otherwise desired.

As will be known in the art, traditional understanding counsels that the profile of the gasket 2 in a resting state substantially match with the internal profile of the bell 12 at the location in which the gasket 2 is intended to reside in final assembly. The purpose of such matching profiles is to allow for tight mating of the gasket 2 into the bell 12 to enhance fluid seal. In the shown embodiment, this conventional wisdom would counsel for the radially outward profile of the gasket 2 to have approximately the same configuration as recess seat 43 of bell 12. As shown in FIG. 1, in a resting state the primary mating surfaces of a prior art gasket would mate smoothly with the internal surfaces of the bell 12. Accordingly, in prior art gaskets, following assembly the profile of the gasket at these areas of sealing interface is substantially the same as the profile of the gasket in the resting state.

Figure 2:
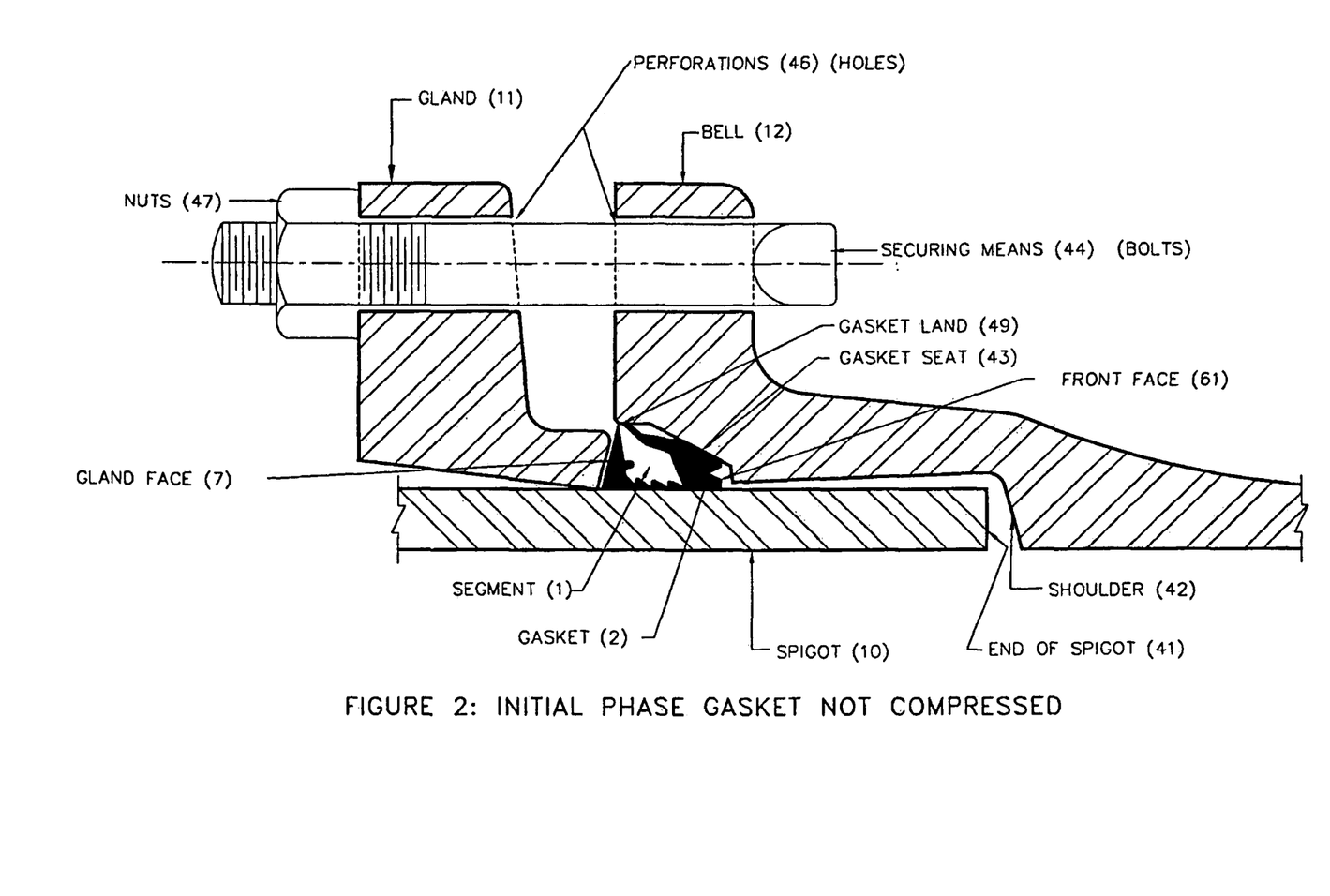
FIG. 2 depicts a cross-sectional view of an un-stressed gasket of the present invention in the initial phase, at a location in which the position and cross-section of the locking segment can be viewed.
Figure 3:
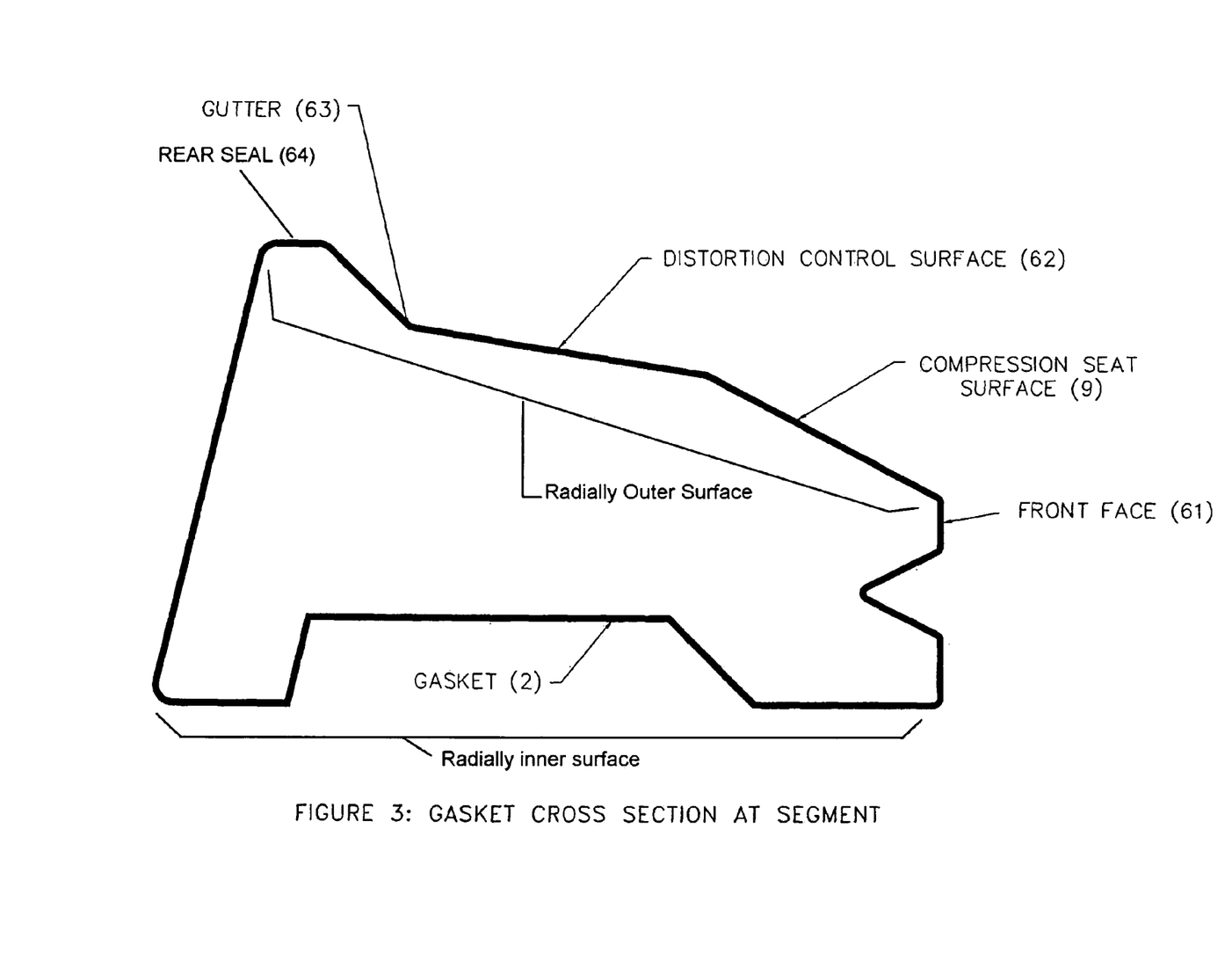
FIG. 3 demonstrates the cross-sectional view of an embodiment of the gasket.
Figure 8:
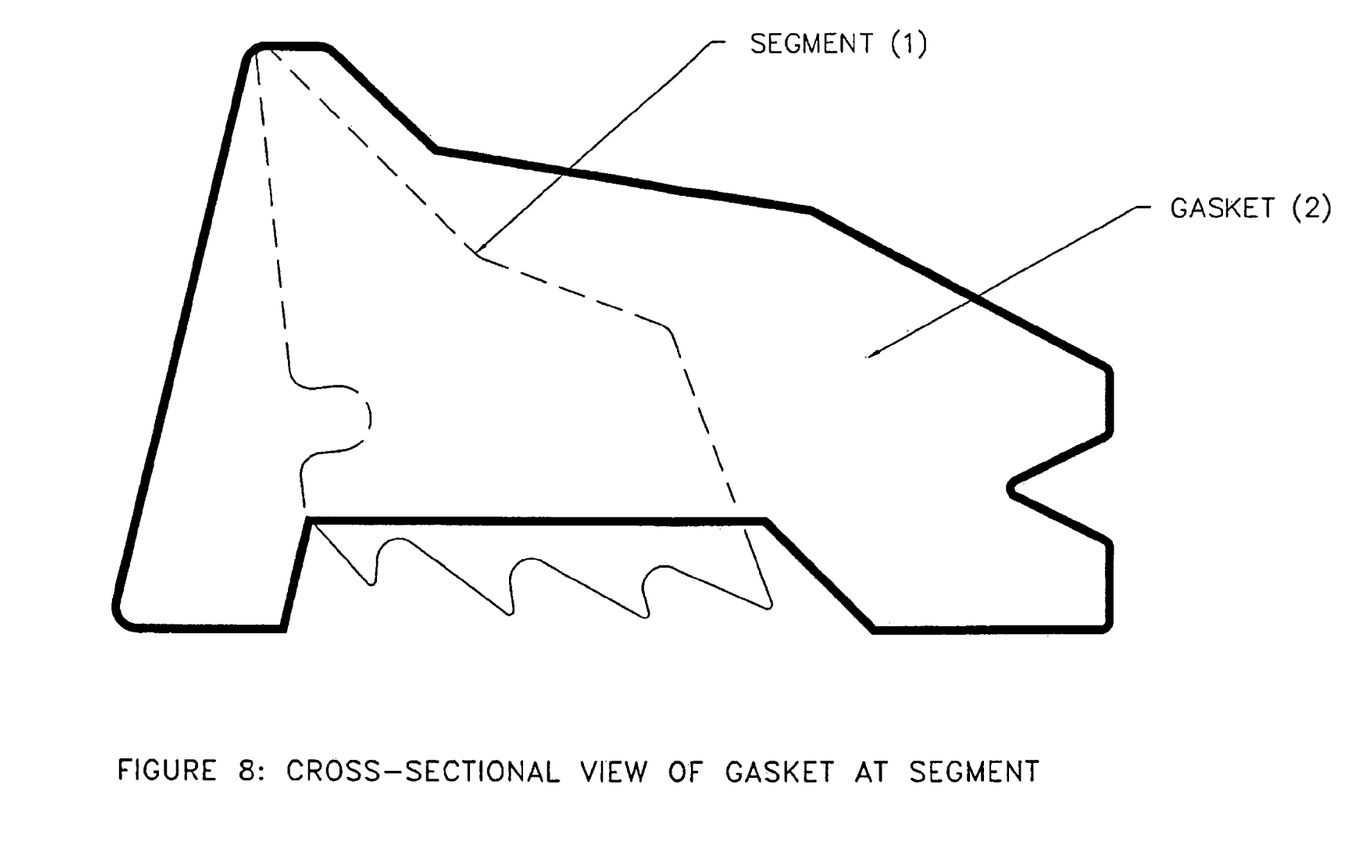
FIG. 8 is a cross-sectional view of a gasket for use in the current invention, showing an alternate embodiment of the locking segment in place.

As is depicted in FIGS. 2 and 8, the locking segment 1 of the present invention may be constructed to fit within a gasket 2 that is configured to fit within any standard mechanical joint without necessitating changes to the configuration of the bell, gland, or spigot. Gasket 2 is an elastomeric or other resilient or deformable material, such as those in the art will understand may be used in the practice of a mechanical joint. A useful configuration of the gasket 2, as shown in FIG. 3, is an annular ring with a radially inner surface 4 that is adapted to be in contact with spigot 10, a gland face 7 that is adapted to be compressed by a gland or compression ring 11, a front face 61 that leads in axial insertion, and a radially outer surface, shown in the drawings as having a configuration that does not mate smoothly with the recess seat 43 in a resting state. Particularly, in the shown embodiment, the radially outer surface of the gasket 2 has a compression seat surface 9 at the leading portion of the gasket 2 near the front face 61 that is designed to mate with and seal against an area of the recess seat 43. Also characterizing the shown embodiment is a distortion control surface 62 that in the resting state leads away from the recess seat 43 to form a radially depressed gutter 63, before the profile of the gasket 2 extends once again radially outward to meet the bell 12 in the area of rear seal 64. Accordingly, the radially outer surface in the shown configuration is the entire area between and including the compression seat surface 9 through rear seal 64; stated differently with reference to the drawings, the radially outer surface is in FIG. 3 the entire "upward" surfaces of the drawing combined. Although these surfaces are readily distinguishable in the drawings and as discussed herein, the transition among surfaces may not be as readily apparent in the uncompressed state as in the configuration shown. In the shown embodiments, gasket 2 conforms to all of the requirements of ANSI/AWWA C111/A21.11-95. In particular, for any given spigot 10, gasket 2 may have a slightly smaller inner diameter than the outer diameter of the spigot 10. Accordingly, placement of gasket 2 over the exterior of spigot 10 may require exertion of force to expand gasket 2 to fit around spigot 10.

Alternatively described, it will be noted that the gutter 63, being an annular depression (radially speaking) is characterized by the fact that if gasket 2 is advanced into the bell 12 as fully as is possible in the resting state (e.g., prior to deformation), and rotated to contact the bell 12 in the area of the recess-seat 43 as much as possible without deformation, a void remains between the gasket 2 and the recess seat 43; such depression or void is the gutter 63. As shown FIGS. 2 and 4, in this embodiment a portion of the gutter 63 remains vacant of gasket material, even during some advanced stages of compression and assembly. It will be noted that the gutter 63 in other embodiments could be covered by a film of rubber or otherwise be a void below the radially outward surface of gasket 2, and still be and operate as a gutter 63 in the spirit and scope of the invention.

Without limiting the application of the structure, effects, or scope of the invention or other possible advantages of practice of the invention, the operational aspects of having this void are believed in the shown embodiment to confer at least two advantages, either of which alone would be an advance in the art. (It should be noted that applicant does not limit the invention by this discussion to only embodiments that possess one or more of these advantages. First, the compression of compression seat surface 9, and separately of distortion control surface 62, against recess seat 43 in different locations is believed to create two separate areas of sealing, with gradients of compression between the points of initial contact with the recess-seat 43, such that sealing efficiency is enhanced. Also, rear seal 64 in compressive contact with gasket land 49 may create yet another area of sealing. This appears to create maximum pressure against at least one point in the area of the gasket 2, which serves to resist high fluid escape pressures, while still taking advantage of the flexibility and other advantages of high surface-area, lower-pressure sealing.

A second perceived benefit is an operational effect on the motion of the segment 1, which is described in more detail, below.

Figure 5:
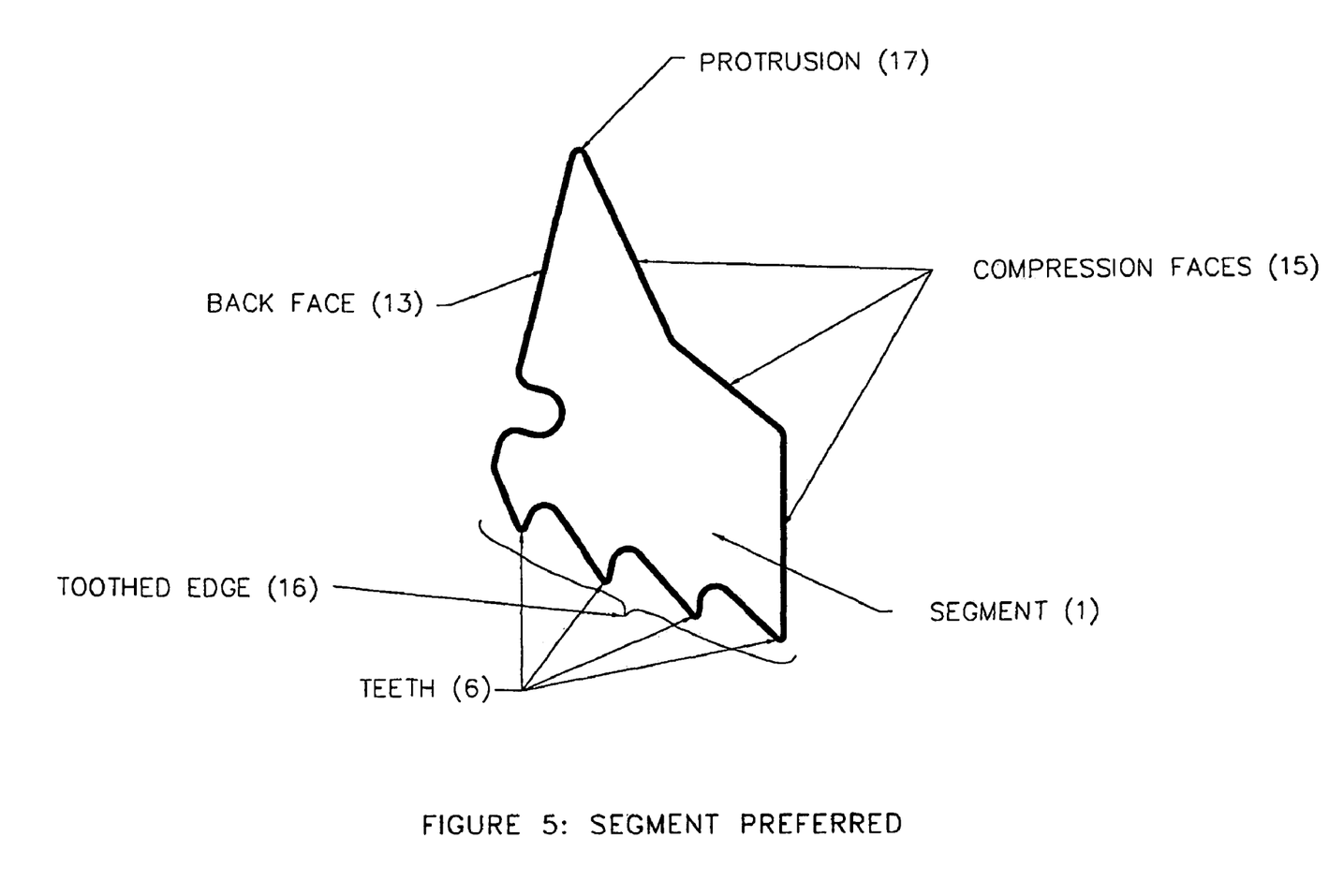
FIG. 5 shows an embodiment of a locking segment configuration useful in the present invention.

Gasket 2 incorporates at least one locking segment 1, which may be configured as shown in FIG. 5, also shown as embedded in the gasket 2 in FIG. 8. In the usual practice of the invention, a number of locking segments 1 will be circumferentially dispersed about and within gasket 2, and though preferable, the placement need not be precisely or even nearly symmetrical. The number of such segments 1 may be selected with reference to the expected separative forces to be encountered by the joint, with a higher force tending to recommend a larger number of segments 1. The inventor prefers to use no fewer than three such segments 1, but the invention is not so limited. For example, a preferred configuration of segments 1 for use with a pipe of eight inch diameter intended to carry fluids at pressures of 350 p.s.i. includes eight to ten segments 1 uniformly spaced around the spigot-facing circumference of gasket 2 (e.g., the radially inner surface 4). An alternative would allow a single segment 1 of a circumference appreciable to (at least one-half the size of) the circumference of gasket 2.

Separative forces (shown diagramatically as vectors 50, 50*a* and 50*b* in FIG. 1) tend to extract spigot 10 from bell 12. As indicated by directional arrow 50, some separative forces follow in-line with the common axis of assembled pipe lengths. Other separative forces are para-axial, as shown by vectors 50*a* and 50*b*, which may be due to bedding shifting or non-uniform securement around the periphery of spigot 10. Segment 1 is intended to grip spigot 10 and to translate separative forces into forces at least partially opposing bell 12. To this end, segment 1 possesses teeth 6 that are adapted to protrude from inner surface 4 of gasket 2, at least upon compression of gasket 2 by gland 11. Teeth 6 are adapted to contact spigot 10, and are most preferably fashioned of a substance that is harder than the material comprising the exterior of spigot 10. In a particular embodiment, teeth 6 are, in the uncompressed state of gasket 2, already exposed from the inner surface 4 as shown by FIG. 8. This exposure may be by protrusion from the inner surface 4, or by slight recessing beneath inner surface 4 in combination with the absence of gasket material covering the teeth, which is the embodiment shown in FIG. 3 and subsequent images. As shown in FIGS. 3 and 8, the gasket 2 may be configured with a recess about teeth 6 to prevent interference with penetration of such teeth 6 into spigot 10. An alternative preferred embodiment presents teeth 6 slightly recessed within gasket 2, and covered by a membrane or thin layer of compressible or puncturable material. The inventors suggest that at least some of the area between teeth 6 or immediately adjacent to teeth 6 be free of rubber to allow penetration of the spigot 10. An advantage of initial concealment is that it allows for greater advancement of gland 11, and thus greater compression of gasket 2, prior to substantial engagement of teeth 6 into spigot 10. A greater sealing effectiveness therefore may be achieved.

Preferably, segment 1 possesses a plurality of teeth 6. In a tested configuration, the tips of teeth 6 are arranged in an arcuate relationship. The arcuate relationship enhances the ability of teeth 6 to bite into spigot 10 despite any variations in circumference of spigot 10 or the inner dimensions of bell 12. This is because a larger gap (frequently due to manufacturing tolerances) between spigot 10 and the inner dimensions of bell 12 (particularly annular gasket recess seat 43) will cause segment 1 in assembly to be rotated upon compression of gasket 2 toward a steeper angle relative to spigot 10 than exists in the unstressed configuration as displayed in FIG. 2. Given the arcuate relationship of teeth 6, upon such rotation of segment 1 the most axially inner teeth rotate into contact with spigot 10. The arcuate configuration further urges at least two teeth 6 to be in contact with spigot 10, regardless of the rotation of segment 1. This is because in the arcuate configuration, a straight line can be drawn between any two adjacent teeth 6. Beneficially, the presence of additional teeth 6 to either side of any biting tooth 6 tends to assist in preventing overpenetration of the spigot 10 by segment 1, due to the fact that these adjacent teeth will be pointed at an angle to spigot 10 such that they are not optimally positioned for biting; rather, adjacent teeth 6 will tend to contact spigot 10 at an angle substantially more parallel to spigot 10 than those teeth 6 that are biting into spigot 10. Accordingly, because of the more-parallel angle, adjacent teeth 6 act as stops to further penetration.

In a shown configuration as detailed in FIG. 5, segment 1 in cross section has a toothed edge 16, with teeth 6 extending therefrom in the arcuate pattern as above discussed; and a back face 13, extending radially and axially along a slope towards protrusion 17. Back face 13 as shown is adapted to be in a close proximity to, or even in direct contact with, gland 11 when the mechanical joint is assembled. Connecting protrusion 17 in the axially inner direction with toothed edge 16, is a surface, or a series of surfaces, denoted compression faces 15. In this embodiment, back face 13 is in close proximity to gland 11 when the joint is assembled, and upper protrusion 17, being the most radially outer area of the segment, is in close proximity to gasket land 49 of the bell. A greater volume of elastomeric material of gasket 2 exists between compression seat surface 9 (particularly shoulder 8) and segment 1 than is present between back face 13 and gland 11.

Upon insertion of spigot 10 into gasket 2, toothed edge 16 of segment 1 may be forced radially outwardly by the presence of spigot 10, and may cause pivoting of segment 1. The volume of compressible material present between the segment's compression faces 15 and recess seat 43 allows for such outward movement or pivoting without compromising the integrity of gasket 2. Given the arcuate configuration of teeth 6 along toothed edge 16, even when rotated radially outwardly, at least one tooth 6 will be poised for contact with spigot 10 upon compression (though the inventor recognizes within the spirit of the invention that any or all of teeth 6 may be removed from direct physical contact with spigot 10 due to teeth 6 of segment 1 being recessed in gasket 2 or the presence of a thin layer of elastomeric material, or other substance, so long as the material, or substance is not sufficient to interfere with the effective grip of at least one of teeth 6 into spigot 10 upon full compression of gasket 2, as is described below). Spigot 10 may be advanced as in the prior art until stopped by annular shoulder 42.

Following such insertion of spigot 10 into bell 12, gasket 2 will be in a position basically as represented in FIG. 2, and the gasket 2 may be already in contact with recess-seat 43 at some point. In any event, substantial compression of gasket 2, as in compression sufficient to effect the sealing and securement of the joint is not at this point effected. Further assembly is carried out by advancing of gland lip 71 against the gasket 2 gland face 7, and into the bell 12. As will be evident to those skilled in the art, this advance of gland 11 will by contact with gasket 2 force gasket 2 inwardly into contact or more forceful contact with recess seat 43. As shown from FIG. 4, gasket 2, and in the shown embodiment specifically compression seat surface 9, begins deformation against recess-seat 43. Deformation of gasket 2, particularly in the area of distortion control surface 62, begins to occur in the shown embodiment prior to substantial rotation of segment 1. This phase of the assembly operation is considered the initial phase and is characterized by substantially translational motion of the segment. The forces acting on the segment are principally balanced between gland 11 acting on the back face 13 of segment 1 and the compression energy stored in the gasket rubber trapped between segment 1, spigot 10 and bell 12. This compression energy acts on segment 1 at a location known as the "center of pressure" that is believed in the shown embodiments to be substantially in line with the force vector imparted by gland 11 acting on segment 1.

Figure 4:
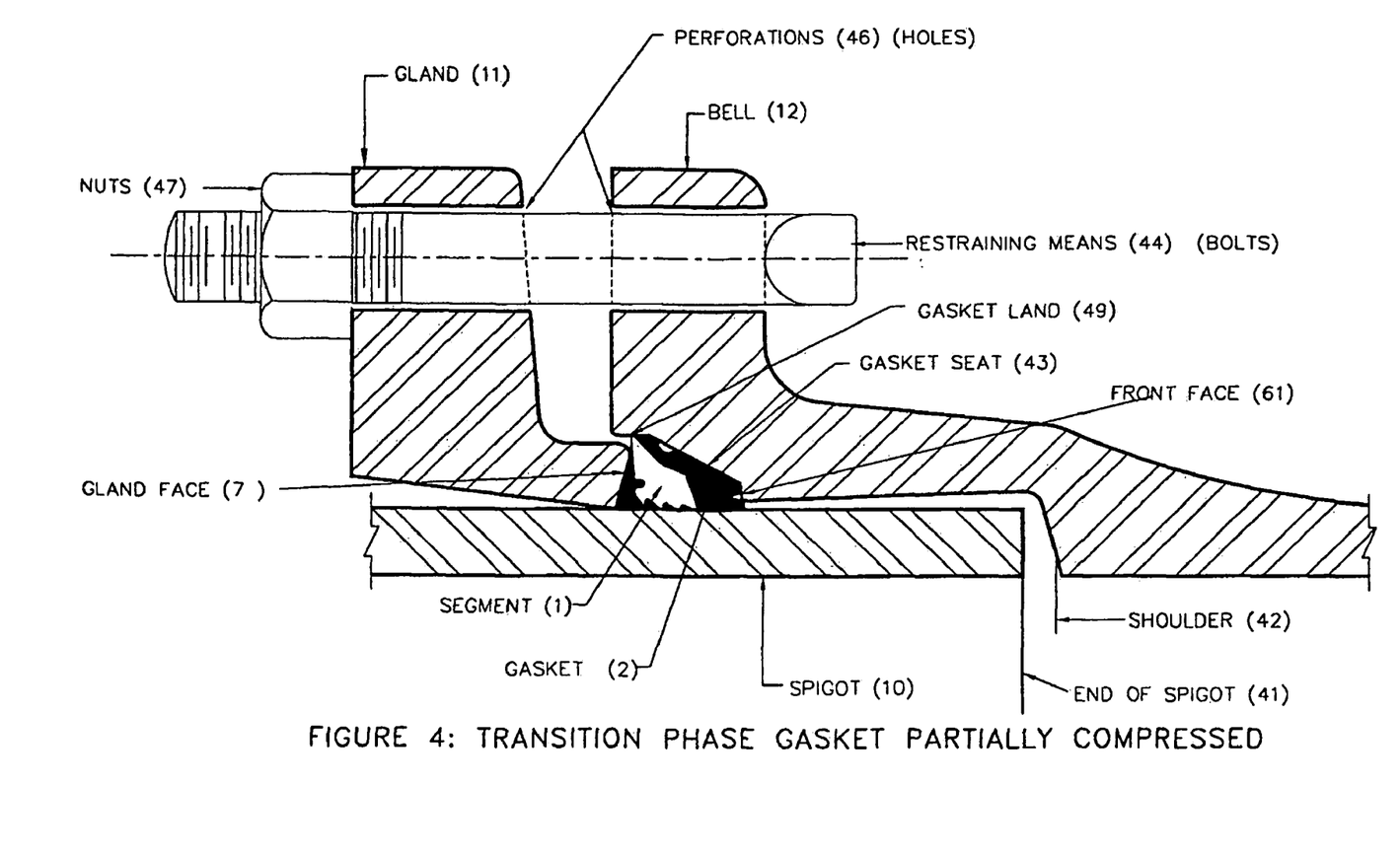
FIG. 4 is a depiction of the gasket and segment in the joint during the act of assembly, in the transition phase.

As gland 11 continues to advance into bell 12 beyond the point shown in FIG. 4, segment 1 begins to rotate. This phase of the assembly operation is the transitional phase and is characterized by a relatively decreasing amount of translational motion of segment 1 and a relatively increasing amount of rotational motion of segment 1. In other words, upper protrusion 17 advances into the bell at a faster rate than teeth 6 for a given input by gland 11. This occurs because the center of pressure of the compression energy stored in the gasket moves closer to the teeth 6 of segment 1 and away from upper protrusion 17 as the gasket is compressed. Rotation of segment 1 at this point is influenced by the gutter 63 and is related to the movement of the center of pressure of the gasket toward teeth 6. Because gutter 63 presents the area of least resistance to compression, and hence to deformation (it being known in the art that rubber tends to deform, in preference to compressing), the upper (as seen in the Figures) portion of the segment 1 rotates toward the gutter 63, reducing the size of the gutter 63 as the gasket material deforms into the area.

Figure 6:
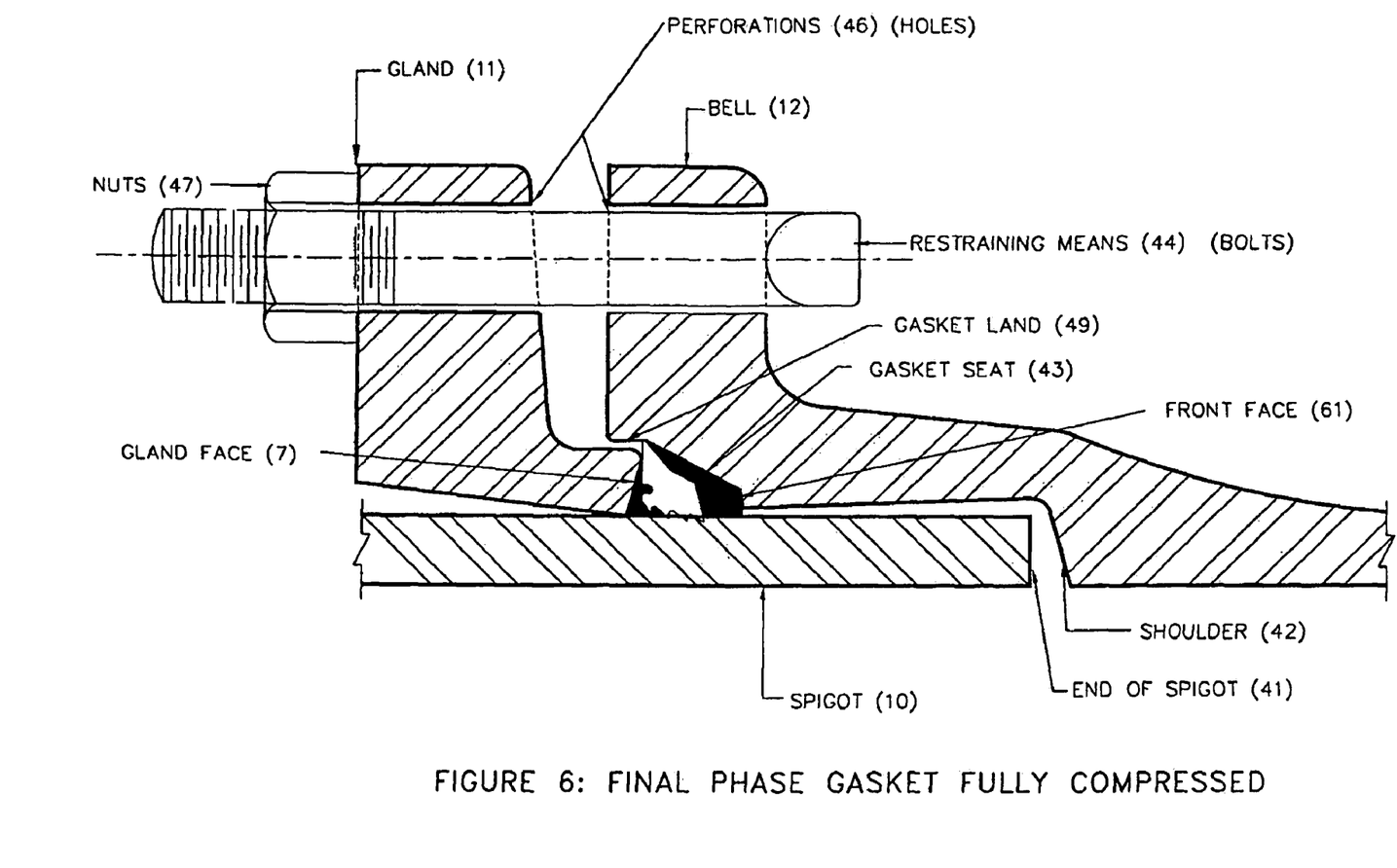
FIG. 6 shows the joint of the present invention following compression and in a locked state, restraining the joint.

Rotation of segment 1 continues substantially in this manner as the gland 11 advances until the point at which segment 1 is in resistive contact with both spigot 10 and bell 12. This phase of the assembly operation shall be known as the final phase and in the shown embodiment is characterized by a substantially rotational motion of segment 1 and a substantial collapse of gutter 63. This segment and gasket orientation is depicted by FIG. 6. The resistive contact in the shown embodiment is specifically between a tooth 6 and protrusion 17 of segment 1 and the corresponding joint surfaces of spigot 10 and bell 12. Until the final phase of assembly is entered, if a tooth 6 is in resistive contact with spigot 10, or protrusion 17 is in resistive contact with bell 12 it will be understood that this contact is of a sliding nature. Upon the substantial collapse of gutter 63 and the start of the final phase of assembly, further gasket deformation is extremely limited which effectively prevents further translation of segment 1 further in the axial direction. Any additional clamping force applied to the securing mechanism between gland 11 and bell 12 (e.g. the bolts 44) imparts a large rotational energy to the segment due to the imbalance between the force vector created by contact of gland 11 and segment 1 vs. the vector between the center of pressure of gasket 2 and segment 1. Any further rotation of segment 1 now causes a penetration of segment 1 into spigot 10 by teeth 6 and a penetration of segment 1 into bell 12 by protrusion 17 via plastic deformation of spigot 10 and bell 12. This penetration provides a mechanical lock between spigot 10 and bell 12 via segment 1 and thus joint restraint is obtained.

Following installation, it will be evident from the foregoing description that at least one tooth 6 remains in gripping contact with spigot 10 and protrusion 17 remains in contact with bell 12. Any attempt of the spigot 10 to move outwardly of bell 12 urges at least this one tooth 6 to move axially outwardly of bell 12 along with spigot 10, but axial movement is not possible due to the resistive contact between back face 13 and lip 71 of the gland and a rotation of the locking segment in a direction that exerts axial resistance as well as radial pressure among the segment 1, the bell 12, and the spigot 10. This axial resistance, or restraint, is caused by the segment rotating into a direction in which its length is greater than the distance between the spigot 10 and the bell 12. The balance between the axial load and the radial load imparted to the bell and spigot affects the performance of the invention and may be influenced by the configuration of segment 1. As the forces trying to separate bell 12 and spigot 10 increase so does the axial resistance imparted to bell 12 and spigot 10 by segment 1. The radial load also imparted keeps teeth 6 and protrusion 17 of segment 1 engaged with spigot 10 and bell 12 respectively. If the radial component is too low, then the segment 1 will disengage spigot 10 or bell 12. If the radial component is too high, then excessive deformation or penetration of spigot 10 by segment 1 may occur.

The inventors note that this feature, like others shown in the embodiments, may exhibit particular advantages, but that the presence or absence of these features and advantages required of the scope of the invention only as limited in each particular claim. Except to the extent expressly included in a claim, the inventors do not consider these advantages, configurations, or possibilities to be limitations on the invention.

Manufacturing tolerances for spigots and bells are not precise; accordingly, in some installations, the distance between spigot 10 and bell 12, including features of bell 12 such as recess seat 43, will be greater or less than such distance in other installations. Under the above described embodiment of segment 1, where the gap between spigot 10 and recess seat 43 is as intended or smaller, upon securement of gland 11 at least on of teeth 6 of segment 1 is driven into spigot 10 and and upper protrusion 17 is driven into bell 12. The inventor believes that due to the supportive pressures of the gasket material, segment 1 does not begin biting engagement with spigot 10 until a generally effective seal among bell 12, spigot 10 and gasket 2 has been effected by compression. Accordingly, teeth 6 are unable to prematurely engage spigot 10 in a manner that may adversely affect the ability to obtain optimal compression of gasket 2. This delayed engagement can be manipulated by the means discussed above; namely, the configuration of the gasket, notably the gutter 63, compression seat surface 9, distortion control surface 62, elastomeric characteristics of the gasket 2, shape of segment 1, position of segment 1 in gasket 2 or various combinations of these features. Due to contact with bell 12 in addition to gland 11, separative forces are transferred by segment 1, not just against gland 11 but also against bell 12. This is significant in that it reduces a potentially substantial force that is resisted by bolts 45 and gland 11. Under high loads, bolts 44 and gland 11 may distort, reducing sealing effectiveness of gasket 2; the current invention's ability to transfer a significant portion of the magnitude of the separative vector directly to bell 12 via segment 1 therefore enhances the effectiveness of sealing.

In contrast to situations as in the previous paragraph, in which the distance between spigot 10 and gasket recess seat 43 is relatively small, an exaggerated pivoting mechanism is believed to occur in segment 1 when the gap is larger, as follows:

The condition that exists in a large gap situation (e.g. when the manufacturing tolerances and assembly conditions exist such that bell 12 dimensions are at a maximum diameter condition and spigot 10 dimensions are at a minimum diameter condition) is such that upon initial assembly, neither gasket 2 or segment 1 may be in contact with either one or both spigot 10 or bell 12. During the transition phase gasket deformation will occur, as previously described, due to compressive forces acting on gasket 2 by spigot 10, gland 11 and bell 12 forcing gasket 2 into contact with both spigot 10 and bell 12. At this point however, segment 1 may still not be in contact with either spigot 10 or bell 12. Approaching the end of the transitional phase of assembly, as gutter 63 of gasket 2 closes up due to elastic deformation of gasket 2 caused by compression of gasket 2, a dramatic rotation of segment 1 will occur due to the previously described shift in the center of pressure of the compressed gasket and its relationship to segment 1. This dramatic rotation allows segment 1 to bridge large gaps for which restraint would otherwise be impossible to provide. The final phase of assembly then proceeds as previously described with teeth 6 embedding in spigot 10 and protrusion 17 embedding in bell 12.

In an embodiment of segment 1, upper protrusion 17 may be formed in an angular configuration. Such an angular configuration will cause such points to bite into bell 12 when sufficient pressure is exerted between segment 1 and bell 12. Although such biting can occur in any event under appropriately high pressures, particularly in the small-gap situation addressed above, the propensity to bite can be controlled by adjusting the acuteness of the angle. The inventor notes that the more acute the angle at either given point, the earlier along a pressure curve the point will likely bite into bell 12. Accordingly, it is possible to adjust the tendency toward desired points of final rotation of segment 1 by adjusting the acuteness of angle of the upper protrusion 17, which will in turn adjust the maximum probable radially outward movement of upper protrusion 17. It should be noted that at pressures sufficient to drive upper protrusion 17 into bell 12, rotation of segment 1 will be substantially prevented and will occur under conditions of plastic deformation of either segment 1, spigot 10 or bell 12. This mechanism can be employed to balance the rotation of segment 1-and control the point of engagement.

Similarly, if upper protrusion 17 is configured in a radiused fashion, movement of segment 1 may be adjusted to allow axial movement of segment 1 until upper protrusion 17 obtains non-compressible abutment with bell 12, at which point the axial and radial forces acting on segment 1 at upper protrusion 17 cause the pivot point to occur in its near vicinity. Variations of this allow further control of segment engagement and the balance of axial and radial loading distributed to all load carrying components of the invention.

Figure 7:
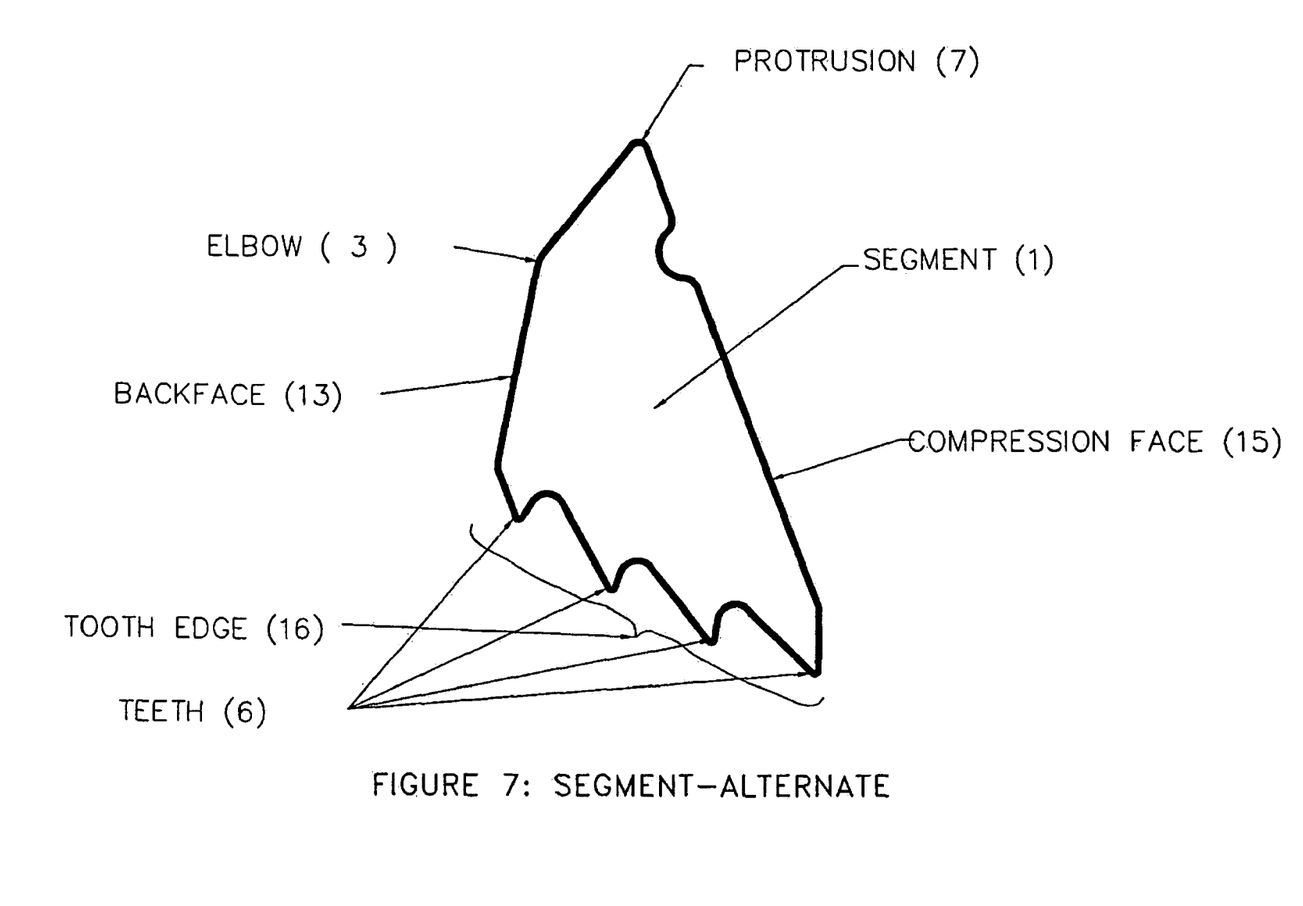
FIG. 7 is an alternative embodiment of the locking segment useful in a gasket of the current invention.

An alternative embodiment, as shown in FIG. 7, may be to incorporate an elbow 3 into the back face of segment 1. Elbow 3 will contact gland 11 during securement of the restraining devices 44 in the initial stages of the transitional assembly phase. The location and configuration of elbow 3 may be tailored to further alter the behavior of segment 1 during rotation, engagement and lockup. The location and configuration of elbow 3 may be further explained by addressing several characteristics of elbow 3 which may be modified to alter segment behavior. If elbow 3 is given a sharp radius, elbow 3 may be made to penetrate gland 11 at the contact point. This penetration will impart additional resistance to further rotation of segment 1 when the final assembly phase is complete thus relieving some of the reliance on the angle of the line of action segment 1 makes relative to spigot 10 and bell 12 when balancing the segments axial and radial load carrying distribution. Additionally, elbow 3 may be positioned radially outward or inward on segment 1. Placing elbow 3 radially outward on the segment will increase the rotational tendency of the segment during the transitional phase of assembly promoting earlier engaement and lockup of segment 1. Placing elbow 3 radially inward on segment 1 will have a correspondingly opposite effect.

If elbow 3 is made such that it penetrates gland 11 while at the same time upper protrusion 17 penetrates into bell 12, a situation may be created whereas both axial and radial loads transferred into bell 12 may be balanced along multiple load paths.

Building upon the concept of altering the acuteness of elbow 3 and upper protrusion 17, the transition between such points may be less pronounced than in FIG. 2. In fact, the transition may be so smooth as to create a general curve that acts as both elbow 3 and upper protrusion 17. A curve could be adapted to effect biting engagement, whether by altering the radius of curvature, or by including nubs or other points to operate as engagement points (which, for purposes of this invention could be considered to be elbow 3 or upper protrusion 17).

Further alternative embodiments that may be included with the foregoing or otherwise substituted for gutter 63 or the area around gutter 63 include the strategic positioning of a secondary or tertiary elastomeric material having different deformation characteristics than the remainder of gasket 2. Such strategic positioning may optimally include placement between frontal slope 15 of segment 1 in the vicinity of upper protrusion 17. This placement would influence the potential of upper protrusion 17 to move toward annular recess seat 43, thereby causing upper protrusion 17 to cease substantial rotation prior to biting into bell 12. Similarly, such secondary or tertiary rubber may be placed radially outwardly of elbow 3 to influence the maximum ability of elbow 3 to move radially outwardly of spigot 10.

Although much of the foregoing is discussed in terms of initial installation of a mechanical joint, the inventor notes the value and applicability of use of the present invention to "retrofit" or repair existing mechanical joints. By simply rejoinably severing the ring of gasket 2 (preferably at an angle to the radius) the gasket 2 can be fit over an existing spigot, and moved into place after removal of the old gasket. The gland 11 can then be re-attached, completing retrofitting of a standard mechanical joint to a gasket-restrained mechanical joint.

The foregoing represents certain exemplary embodiments of the invention selected to teach the principles and practice of the invention generally to those in the art so that they may use their standard skill in the art to make these embodiments or other and variable embodiments of the claimed invention, based on industry skill, while remaining within the scope and practice of the invention, as well as the inventive teaching of this disclosure. The inventor stresses that the invention has numerous particular embodiments, the scope of which shall not be restricted further than the claims as issued. Unless otherwise specifically stated, applicant does not by consistent use of any term in the detailed description in connection with an illustrative embodiment intend to limit the meaning of that term to a particular meaning more narrow than that understood for the term generally.

I claim:

1. A combination of a restraining gasket together with a gland, for use in a stuffing box assembly when connecting a male pipe portion to a female pipe portion, wherein said gland is adapted to be tightenably connected to the female pipe portion, and said restraining gasket comprises:
   a) a deformable body having a spigot-facing surface, a radially outward surface, a gland-facing surface in communication with said gland, and a gutter positioned at or radially inward of the radially outward surface and between the a radially outermost area of the locking member and a surface of the gasket that contacts the female pipe portion when the gland is connected to the female pipe portion with the gasket therein between,
   b) a locking member disposed at least partially between the gutter and said gland-facing surface, said member having a tooth portion and an embedded body portion, wherein at least a portion of the tooth portion is positioned to engage the male pipe portion.

2. A method of assembling a restrained mechanical joint, comprising the steps of:
   a) urging a portion of a gasket into a sealing relationship between a bell and a spigot, and
   b) subsequent to step (a), deforming the gasket by tightening a gland to the bell to at least partially collapse a gutter in the gasket;
   c) subsequent to beginning step (b), rotating a locking segment into resistive contact between the bell and the spigot.

3. A method of assembly as in claim 2, wherein the gutter is a void below a radially outer surface of the gasket.

4. A method of assembly as in claim 2, wherein the gutter is an annular depression in a radially outer surface of the gasket.

5. A gland in combination with a restraining gasket for use in a stuffing box assembly, wherein the gasket comprises a locking segment and is adapted to change its center of pressure as it deforms in response to tightening of the gland to a bell, in such a manner that, during a stage of deformation, a translation of the locking segment occurs in an axial direction, followed in a later stage of deformation by rotation of the locking member, and wherein the locking segment has at least one tooth facing radially inwardly, and is positioned in the gasket such that collapsing of the gutter provides a greater range of motion to a radially outward end of the segment than to the radially inward end of the segment.

6. A gasket as in claim 5, wherein said locking segment comprises a plurality of teeth disposed radially inwardly and an area between at least two of said teeth is devoid of gasket material.

* * * * *